(12) United States Patent
Schmitt et al.

(10) Patent No.: US 7,044,248 B2
(45) Date of Patent: May 16, 2006

(54) METHOD AND ARRANGEMENT FOR CONTROLLING THE DRIVING SPEED OF A VEHICLE

(75) Inventors: Johannes Schmitt, Markgroeningen (DE); Tobias Weiss, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 110 days.

(21) Appl. No.: 10/456,628

(22) Filed: Jun. 9, 2003

(65) Prior Publication Data

US 2003/0234126 A1   Dec. 25, 2003

(30) Foreign Application Priority Data

Jun. 25, 2002   (DE)   ................................ 102 28 348

(51) Int. Cl.
*B60K 31/00*   (2006.01)

(52) U.S. Cl. .................. 180/170; 180/197; 701/85; 364/426.01

(58) Field of Classification Search ................ 180/170, 180/197; 701/85, 97, 48; 364/426.01, 426.02, 364/426.03, 426.04
See application file for complete search history.

(56) References Cited

U.S. PATENT DOCUMENTS

| 4,951,208 | A | * | 8/1990 | Etoh | ............................ 701/97 |
| 4,987,966 | A | * | 1/1991 | Fujita | ......................... 180/197 |
| 5,107,948 | A | * | 4/1992 | Yamamoto | .................. 180/197 |
| 5,124,922 | A | * | 6/1992 | Akiyama | ..................... 701/85 |
| 5,366,039 | A | * | 11/1994 | Sawada | ....................... 180/197 |
| 5,400,865 | A | * | 3/1995 | Togai et al. | ................ 180/197 |
| 5,732,380 | A | * | 3/1998 | Iwata | .......................... 701/85 |
| 6,253,123 | B1 | * | 6/2001 | Schramm et al. | .............. 701/1 |

FOREIGN PATENT DOCUMENTS

DE          41 23 110         1/1992

* cited by examiner

*Primary Examiner*—Chris Ellis
*Assistant Examiner*—Kelly E. Campbell
(74) *Attorney, Agent, or Firm*—Walter Ottesen

(57) ABSTRACT

The invention is directed to a method and an arrangement for controlling the driving speed of a vehicle. The method and arrangement make possible a use of a driving speed controller even for adverse road conditions. A desired value (VDES) is inputted for the driving speed in dependence upon the friction contact between the vehicle wheels and the roadway. Control of the driving speed is deactivated during intervention of the drive slip control in the drive power of the vehicle. The desired value (VDES) for the driving speed is reduced after the intervention of the drive slip control.

5 Claims, 1 Drawing Sheet

METHOD AND ARRANGEMENT FOR CONTROLLING THE DRIVING SPEED OF A VEHICLE

BACKGROUND OF THE INVENTION

An arrangement for controlling the driving speed in a motor vehicle is already known from German patent publication 4,123,110. Here, the motor vehicle is equipped with a drive unit in addition to a power actuating member and a brake. The arrangement includes a device to which signals are supplied for a desired speed selectable by the driver as well as signals for a safety-based desired speed. The signals for a safety-based desired speed are obtained by means of a distance sensor which detects the distance to obstacles disposed ahead of the vehicle and especially a further traveling vehicle. These signals are supplied to the device for selecting the lowest desired speed as the instantaneous desired speed and for obtaining actuating signals for the power actuating member or the brakes when there is a deviation between the actual speed and the instantaneous desired speed. Signals, which are generated in traffic guiding devices external to the vehicle for permissible maximum speeds, are also supplied to the device as a permissible desired speed.

Furthermore, signals, which consider the friction contact between the vehicle wheels and the roadway, can also be supplied to the vehicle for subsequent reasonable maximum speeds, that is, desired speeds conditioned by the coefficient of friction. The device is designed to select the smallest of these desired speeds as the instantaneous desired speed.

SUMMARY OF THE INVENTION

Compared to the above, the method and arrangement of the invention afford the advantage that the control of the driving speed is deactivated during an intervention of a drive slip control in a drive power of the vehicle and that the desired value for the driving speed is reduced after the intervention of the drive slip control. In this way, the control of the driving speed can again be activated without further user input after the end of the intervention of the drive slip control. A higher driving safety is ensured by the reduction of the desired value for the driving speed and a renewed intervention of the drive slip control is less likely. In this way, a gain in comfort without loss of safety for the driver is obtained. The driver can also drive with the driving speed control when adverse roadway conditions are present. After a short-time deactivation during the intervention of the drive slip control, the driving speed control can again be switched on with a safety-based reduced desired value for the vehicle speed without further actuation by the driver.

It is especially advantageous when the desired value for the driving speed is adjusted at most to a driving speed reached after the intervention of the drive slip control. In this way, the effect of the intervention of the drive slip control on the driving speed can be fully considered for the adjustment of the reduced desired speed so that for a renewed activation of the driving speed control at the reduced desired value, the driving safety is maintained as well as possible. A renewed intervention of the drive slip control is therefore considerably less likely.

Furthermore, a reduction of the desired value which is too great can be prevented when the desired value is adjusted approximately to the driving speed obtained after the intervention of the drive slip control so that it is ensured that the vehicle travels as close as possible to the physical limit region. To guarantee a renewed activation of the driving speed controller with the highest driving safety possible after termination of the intervention of the drive slip control, it can be advantageously provided to adjust the desired value for the driving speed to a value which is less by a pregiven difference than the driving speed obtained after intervention of the drive slip control.

This pregiven difference can be selected in dependence upon the driving speed obtained after intervention of the drive slip control. In this way, the driving safety can be adjusted in dependence upon driving speed after a renewed activation of the driving speed control after ending of the intervention of the drive slip control.

It is advantageous when the pregiven difference is selected that much greater, the greater the road speed is after intervention of the drive slip control. In this way, for high driving speeds, a sharper reduction of the desired value for the driving speed can be carried out for reasons of safety.

It is especially advantageous when the control of the driving speed is again automatically activated when the intervention of the drive slip control is ended. In this way, the comfort for the driver is increased because the driver must not himself again activate the driving speed control after intervention of the drive slip control and also must not himself input a new desired value for the driving speed.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
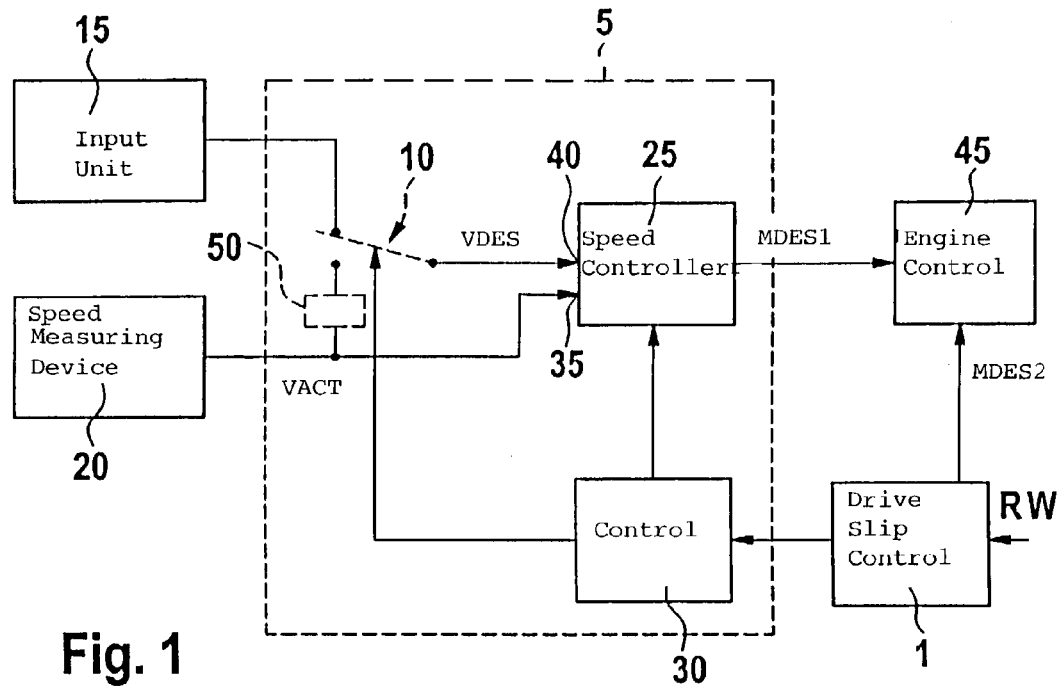
FIG. 1 is a block circuit diagram of the arrangement of the invention.

In FIG. 1, reference numeral 1 identifies a drive slip control of a vehicle which is connected to an arrangement 5 for controlling the driving speed of the vehicle. The arrangement 5 includes the following: a control 30, a driving speed controller 25 and a switch 10. The drive slip control is connected to the control 30. The control 30 controls the driving speed controller 25 and the switch 10. A speed measuring device 20 is connected to the arrangement 5 and outputs an instantaneous actual speed value VACT to a first control input 35 of the driving speed controller 25. The speed measuring device 20 or an input unit 15 can be connected to the arrangement 5 via the switch 10. Either the input unit 15 or the speed measuring device 20 can be connected via the switch 10 to a second control input 40 of the driving speed controller 25. In this way, either the instantaneous actual speed VACT of the speed measuring device 20 or an input value of the input unit 15 can be supplied to the second control input 40. The second control input 40 functions to input a desired speed VDES for the driving speed controller 25. The driving speed controller 25 outputs a suitable first desired torque value MDES1 to an engine control of the vehicle in order that the instantaneous actual speed VACT tracks the desired speed VDES. The first desired torque value MDES1 is converted by the engine control 45 in a manner known per se. This conversion is dependent upon the type of engine used and occurs, for example, via suitable adjustment of the ignition angle, the injection time, the charge, et cetera.

Usually, the driver of a vehicle inputs the desired speed VDES via the input unit 15 which can, for example, be a lever of a vehicle-speed controller. This means that the control 30 usually drives the switch 10 in such a manner that the input unit 15 is connected to the second control input 40. FIG. 1 is a purely functional representation and does not fix any hardware subdivision of the individual components. Accordingly, control 30 can be part of the engine control.

A friction value RW is supplied to the drive slip control 1 and represents the friction contact between the vehicle wheels and the roadway. The drive slip control 1 outputs a second desired torque value MDES2 to the engine control 45 in dependence upon the friction value RW. The drive slip control 1 outputs the second desired torque value MDES2, for example, to the engine control 45 only when the friction value RW drops below a pregiven threshold value. The second desired torque value MDES2 is so selected that the drive power of the vehicle is reduced in order to again achieve a friction value RW above the pregiven threshold value and prevent a slippage of the drive wheels. The lower one of the two desired torque values (MDES1, MDES2) is converted by the engine control 45. Accordingly, if the second desired torque value MDES2 drops below the first desired torque value MDES1, then the second desired torque value MDES2 is converted by the engine control 45 and the first desired torque value MDES1 is no longer converted. This corresponds to a deactivation of the driving speed control. This can also actively take place in that the drive slip control 1 causes the control 30 to switch off the driving speed controller 25 so that the controller 25 no longer outputs a desired torque value to the engine control 45. In this way, it is ensured that no desired torque input of the driving speed controller 25 is converted by the engine control 45. In this way, the control of the driving speed is deactivated by the arrangement 5 during an intervention of the drive slip control 1 in a drive power of the vehicle (especially for the duration of the intervention) and the second desired torque value MDES2 is converted by the engine control 45.

As soon as the second desired torque value MDES2 has been converted by the engine control 45, the intervention of the drive slip control 1 on the desired torque value input for the engine control 45 is ended. Already during or also after the intervention of the drive slip control 1, the control 30 can drive the switch 10 in such a manner that the switch connects the speed measuring device 20 to the second control input 40. In this way, the instantaneous actual speed VACT of the vehicle is applied to the second control input 40 as a desired speed VDES. As soon as the intervention of the drive slip control 1 is ended, the drive slip control 1 appropriately informs the control 30. The control 30 then activates the driving speed controller 25 again which receives the instantaneous actual speed value VACT, which is present after the termination of the intervention of the drive slip control 1, as a new desired speed input. Thereafter, the control 30 can cause the switch 10 to again connect the input unit 15 to the second control input 40 in order to make possible a new user input for the desired speed VDES. As long as no new desired speed is pregiven by the user at the input unit 15, however, the driving speed controller 25 causes the instantaneous actual speed VACT to track the actual speed, which is present at the termination of the intervention of the drive slip control 1, as a new desired speed VDES and forms the corresponding first desired torque value MDES1 for the engine control 45. After the intervention of the drive slip control 1, the latter no longer outputs a desired torque value to the engine control 45 as long as no renewed intervention of the drive slip control 1 is required.

A reduction of the drive power of the vehicle and therefore a reduction of the actual speed VACT occurs because of the missing propulsion in the slip phase and the input of the second desired torque value MDES2. The new desired speed VDES after termination of the intervention of the drive slip control 1 in the form of the then present actual speed VACT is then, as a rule, reduced compared to the desired speed VDES before the intervention of the drive slip control 1. The extent of the reduction of the desired speed VDES is advantageously so selected that it is adjusted maximally up to a driving speed, which is reached after the intervention of the drive slip control, in the form of the then present actual speed VACT.

In the above-described embodiment, and after a terminated intervention of the drive slip control 1, the then instantaneous actual speed VACT is inputted as a new desired speed VDES. This new desired speed VDES is slightly less than the old desired speed before the intervention of the drive slip control 1 because, during the slip phase up to the conversion of the second desired torque value MDES2, no propulsion could be attained and the vehicle became slower. If the new desired speed still is too great or the friction value RW again drops below the pregiven desired value also for the new desired speed, then the drive slip control 1 again intervenes in the manner described. The desired speed VDES is then, in turn, reduced in the manner described. This operation is repeated until the maximum possible desired speed VDES for the instantaneous friction value RW is reached. This type of desired value input VDES makes it possible to drive in the physical limit region.

Such driving in the physical limit region is not suitable for the average driver. For this reason, an alternative can be provided so that the desired value VDES for the driving speed is, after termination of the intervention of the drive slip control 1, adjusted to a value which is less by a pregiven difference than the driving speed reached after intervention of the drive slip control 1. For this purpose, and as shown in phantom outline in FIG. 1, the arrangement 5 can include a difference value former 50 which reduces the instantaneous actual speed value VACT determined by the speed measuring device 20 by the pregiven difference and, with a suitable switch position of the switch 10, outputs the reduced actual speed value to the second controller input 40 as a new desired value VDES for the driving speed. For the above-described embodiment, the pregiven difference can be selected as zero and the difference value former 50 can be omitted. In the alternate second embodiment described here, the pregiven difference is, however, greater than zero and so makes possible, for safety reasons, a greater reduction for the new desired speed VDES after the termination of the intervention of the drive slip control 1. In addition, the pregiven difference can be selected in dependence upon the driving speed reached after the intervention of the drive slip control 1. The pregiven difference can be applied by means of a characteristic line in dependence upon the instantaneous actual speed VACT reached after the intervention of the drive slip control 1. For example, the pregiven difference can be selected to be greater the greater the driving speed is (that is, the actual speed VACT) after determination of the intervention of the drive slip control 1. In this way, and at higher speeds, a sharper reduction of the actual speed VACT, which is present after the intervention of the drive slip control 1, can be applied for forming the new desired speed VDES for reasons of safety.

In both described embodiments, the control of the driving speed is again automatically activated when the intervention of the drive slip control 1 is ended.

According to the described embodiments, the desired speed VDES is automatically adapted in such a manner to the instantaneous friction values RW that, at low friction values, the driving speed control is reduced to the safer desired speed VDES at which a slippage of the driven wheel, as a rule, is prevented. If, during an activated driving speed control, an intervention of the drive slip control 1 occurs, then there is not a complete movement out of the road speed control; instead, the driving speed control is deactivated only for the duration of the intervention of the drive slip control 1. After termination of the intervention of the drive slip control 1, the driving speed control is again activated and the desired speed VDES is reduced to the then present actual speed value VACT. In this way, a gain in comfort is achieved without a loss in safety. The driver can, even for adverse road conditions, drive with the driving speed control without there being a complete movement out of the driving speed control when there are short disturbances such as water puddles and a corresponding reduction of the friction values RW. The driving speed control is only deactivated during the intervention of the drive slip control 1 and is again activated automatically at a reduced desired speed VDES.

Figure 2:
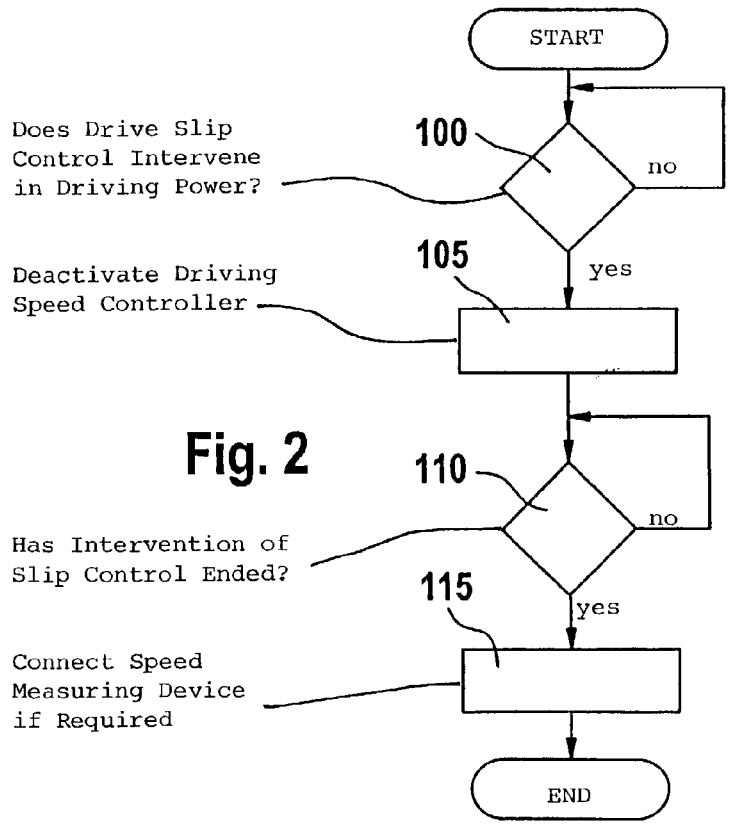
FIG. 2 is a sequence diagram for explaining the method of the invention.

FIG. 2 shows a sequence diagram for explaining the method of the invention. The program is started with the activation of the driving speed control. At program point 100, the control 30 checks whether the drive slip control 1 intervenes in the driving power of the vehicle which, for example, can take place because of corresponding information of the control 30 via the drive slip control 1. If an intervention of the drive slip control 1 is present, then there is a branching to program point 105; otherwise, there is a branching back to program point 100. At program point 105, the control 30 deactivates the driving speed controller 25. This deactivation can, as described, take place also automatically in that the second desired torque value MDES2 is less than the first desired torque value MDES1 and is therefore converted by the engine control 45. Thereafter, there is a branching to program point 110. At program point 110, the control 30 checks whether the intervention of the drive slip control 1 is ended. This can, in turn, be transmitted by a corresponding signal of the drive slip control 1 to the control 30. If the intervention of the drive slip control 1 is ended, then there is a branching to a program point 115; otherwise, there is a branching back to program point 110. At program point 115, the control 30 drives the switch 10 to connect the speed measuring device 20, if required, via the difference value former 50, to the second control input 40 so that the new desired speed VDES of the actual speed VACT, which is present at the termination of the intervention of the drive slip control 1, is formed, if required, reduced by the pregiven difference. Thereafter, the control 30 again activates the driving speed controller 25. The driving speed controller 25 tracks the instantaneous actual speed VACT to the new desired speed VDES. Thereafter, there is a movement out of the program, or is started anew by activating the driving speed controller 25 if the engine is not switched off by the driver.

It is understood that the foregoing description is that of the preferred embodiments of the invention and that various changes and modifications may be made thereto without departing from the spirit and scope of the invention as defined in the appended claims.

What is claimed is:

1. A method for controlling the vehicle speed of a vehicle, the method comprising the steps of:
    inputting a desired value (VDES) for the vehicle speed in dependence upon the friction between the wheels of said vehicle and the roadway;
    deactivating the control of the vehicle speed during an intervention of a drive slip control in a driving power of said vehicle;
    reducing said desired value (VDES) for the vehicle speed after termination of said intervention of said slip control; and,
    adjusting said desired value (VDES) for the vehicle speed at most to a vehicle speed reached after said intervention of said slip control.

2. A method for controlling the vehicle speed of a vehicle, the method comprising the steps of:
    inputting a desired value (VDES) for the vehicle speed in dependence upon the friction between the wheels of said vehicle and the roadway;
    deactivating the control of the vehicle speed during an intervention of a drive slip control in a driving power of said vehicle;
    reducing said desired value (VDES) for the vehicle speed after said intervention of said slip control; and,
    adjusting said desired value (VDES) for the vehicle speed to a value which is less by a pregiven difference than the vehicle speed reached after said intervention of said drive slip control.

3. The method of claim 2, wherein the pregiven difference is selected in dependence upon the vehicle speed reached after the intervention of said drive slip control.

4. The method of claim 2, wherein the pregiven difference is selected to be greater the greater the vehicle speed is after said intervention of said drive slip control.

5. A method for controlling the vehicle speed of a vehicle, the method comprising the steps of:
    inputting a desired value (VDES) for the vehicle speed in dependence upon the friction between the wheels of said vehicle and the roadway;
    deactivating the control of the vehicle speed during an intervention of a drive slip control in a driving power of said vehicle;
    reducing said desired value (VDES) for the vehicle speed after termination of said intervention of said slip control; and,
    automatically activating the control of the road speed again when the intervention of the drive slip control is ended.

* * * * *